United States Patent
Needham et al.

(10) Patent No.: US 9,485,912 B2
(45) Date of Patent: Nov. 8, 2016

(54) TREE LOCATION SENSING SYSTEM FOR AGRICULTURAL TREE HARVESTERS

(71) Applicant: ORCHARD MACHINERY CORPORATION, Yuba City, CA (US)

(72) Inventors: Duane Lee Needham, San Francisco, CA (US); Brian Michael Andersen, Yuba City, CA (US); Tyler Calvin Niday, Yuba City, CA (US); Donald Paul Mayo, Live Oak, CA (US)

(73) Assignee: ORCHARD MACHINERY CORPORATION, Yuba City, CA (US)

( * ) Notice: Subject to any disclaimer, the term of this patent is extended or adjusted under 35 U.S.C. 154(b) by 3 days.

(21) Appl. No.: 14/611,261

(22) Filed: Feb. 1, 2015

(65) Prior Publication Data

US 2016/0219787 A1    Aug. 4, 2016

(51) Int. Cl.
*G06F 19/00* (2011.01)
*A01D 46/26* (2006.01)
*G05B 19/042* (2006.01)

(52) U.S. Cl.
CPC .............. *A01D 46/26* (2013.01); *G05B 19/042* (2013.01); *A01D 2046/266* (2013.01); *G05B 2219/25022* (2013.01); *G05B 2219/45003* (2013.01)

(58) Field of Classification Search
CPC ....... A01D 46/24; A01D 46/26; A01G 25/16

USPC ............ 701/36, 41, 50; 56/340.1; 172/4.5, 9
See application file for complete search history.

(56) References Cited

U.S. PATENT DOCUMENTS

| | | | |
|---|---|---|---|
| 3,163,458 A | 12/1964 | Brandt, Jr. | |
| 3,220,268 A | 11/1965 | Brandt, Jr. | |
| 3,221,567 A | 12/1965 | Brandt, Jr. | |
| 3,318,629 A | 5/1967 | Brandt, Jr. | |
| 6,658,834 B1 | 12/2003 | Mayo | |
| 7,543,436 B2 * | 6/2009 | Scott | A01D 46/264 56/328.1 |
| 7,757,471 B2 | 7/2010 | Mayo | |
| 2008/0016838 A1* | 1/2008 | Pellenc | A01D 46/26 56/340.1 |
| 2010/0095644 A1* | 4/2010 | Mayo | A01D 46/26 56/10.2 R |
| 2011/0047956 A1* | 3/2011 | Snell | A01D 46/26 56/340.1 |

* cited by examiner

*Primary Examiner* — Gertrude Arthur Jeanglaud
(74) *Attorney, Agent, or Firm* — Lewis Brisbois Bisgaard & Smith LLP

(57) ABSTRACT

A system for sensing the location of a tree trunk relative to an orchard harvester, which includes a body, including a distance sensor mounted on the body, a boom movably connected to the body, a tree shaker head having two opposed jaws and rotatably connected to the boom and a programmable controller in communication with the distance sensor, the controller programmed to manipulate the angle at which the distance sensor measures distance as determined by a measured height at which the shaker head jaws will clamp a proximate tree.

17 Claims, 7 Drawing Sheets

TREE LOCATION SENSING SYSTEM FOR AGRICULTURAL TREE HARVESTERS

FIELD OF INVENTION

The present invention relates generally to agricultural tree harvest vehicles including tree shakers which utilize shaker heads to remove nuts and fruit from trees and assist vehicles which catch or gather the crop. More particularly, the present invention relates to sensors and algorithms enabling harvester equipment to detect and reference locations of trees for automated vehicle navigation, clamping, shaking, and catching.

BACKGROUND OF THE INVENTION

When the harvest of a particular orchard crop occurs, the specific crops on each of thousands of trees become ripe at about the same time. Harvest of these thousands of trees is a time consuming process which must be completed quickly while the crop is optimally ripe, and it is therefore advantageous to create systems that complete the harvesting operations as quickly as possible. The conventional solution for rapidly harvesting tree crops include mechanized tree harvesters which, through conventional electro-hydraulic control systems shake nut and fruit trees to cause the crop of nuts or fruit to drop off of the tree. Such harvesters generally are driven to a location proximate to a tree to be harvested, and a shaker head extends towards the tree. The shaker head generally includes movable jaws with pads that clamp the tree and a motor that powers the shaking process. Different types of trees require different clamping positions on the trunk. Larger trees and trees that have been grafted to a larger rootstock are often clamped higher from the ground, and trees that are leaning are often clamped at an angle. Mechanized harvesters are well known in the art, and are described, for example, in U.S. Pat. Nos. 3,163,458; 3,220,268; 3,221,567; and 3,318,629.

When it is desired that the crop not touch the ground, harvest equipment with catching frames are used. This harvest method typically operates with a pair of harvesters: a shaker-equipped vehicle with a catching frame which operates on one side of a tree and a crop receiving vehicle with a catching frame on the other side of the tree. Both harvest vehicles must propel to and stop at a location alongside each of the trees to be harvested in order to catch the crop.

Operation of a mechanized tree harvester requires skill and stamina, due to repeated starting and stopping the vehicle adjacent to each tree, extending the clamping arm to a proper distance, and shaking each tree for a desired duration. In order to relieve the operator of some of this laborious operation, partial automation systems that use sensors and controls on tree harvesters have been developed. For instance, tree shaking machines with sensors and automation controllers are described in U.S. Pat. Nos. 6,658,834 and 7,757,471, both of which are incorporated by reference herein in their entirety for all purposes.

U.S. Pat. No. 6,658,834 ("the '834 patent") describes a tree sensing device, mounted upon a harvester and controlled by a conventional electro-hydraulic controller. Shaker head control parameters including a desired predetermined tree distance are input into a programmable controller. When the harvester is driven to a location next to a tree, the operator initiates an automated tree shaking cycle in which a tree sensor provides signals representative of the distance from the sensor to the tree as input signals to the controller. The controller then calculates a measured distance from the tree to the harvester and compares the measured distance to the predetermined tree distance and provides shaker head control signals to cause the shaker head to move outward towards the tree and halt when the measured distance is equal to or less than the predetermined distance. The control system then provides control signals to the shaker head components to cause the shaker head to clamp the tree, to shake the tree, to unclamp the tree and/or to move the shaker head back to the harvester. Further input signals to the controller include desired engine RPM signals for controlling the engine speed and tree shaking time signals for controlling the duration of the tree shaking.

U.S. Pat. No. 7,757,471 ("the '471 patent") describes a tree harvester control system which incorporates the sensor and automated shaking process of the '834 patent while automatically steering, propelling, and/or stopping the harvester machine to shake each tree. The system incorporates a programmable controller which calculates the distances from machine to tree and from tree to tree. The controller utilizes the relative tree locations to calculate the angular adjustment needed and turns a steering caster the desired angle in order to point the shaker in the correct direction. The controller then causes the harvester to move to the recalculated position and the cycle then repeats itself.

While the systems described in the '834 patent and the '471 patent sense and determine tree location relative to a harvester, the current system and method provides significant improvements to those harvesters, particularly regarding tree location sensing and determination technology. The above patents discuss several types of tree sensors including lasers and describe using an ultrasonic tree sensor mounted directly on the shaker head. However, years of use and evaluation have shown that tree branches can interfere with an ultrasonic measurement of the tree trunk distance, and the very high vibration of the shaker head exceeds the maximum acceleration most sensors can tolerate, causing inaccurate measurements and reducing the operational life of the sensors. Further, the dusty and unpredictable environment introduces challenges to any sensor used. Because accurate determination of tree locations are important for automated shaking and harvester navigation, there is a need for mechanisms and systems to consistently make accurate tree distance and location calculations.

Due to the above highlighted concerns in the field of agricultural tree harvesting, a need exists for refinements and improvements to tree sensing and location referencing technology. While various implementations of partial harvester automation have been developed, no known system has emerged that encompasses the features hereafter presented in accordance with aspects of the present invention.

SUMMARY OF INVENTION

The present invention improves upon tree sensing technology by providing means for accurate measurement of tree locations. The features described below, which are not presently known, allow for more accurate measurement of the clamping location of tree trunks that are standing at an angle or that are grafted to larger rootstocks.

As presently described, a tree distance sensor apparatus, such as a distance sensor in the form of a laser or imaging camera, is mounted on a harvester. The sensor locates the trunk of a tree and provides signals representative of the distance from the tree to the sensor to a controller in communication with the distance sensor. The tree distance sensor apparatus may be incorporated into existing tree harvesters such as those with mechanized tree shakers, and may also be incorporated into a catching frame vehicle or a nut sweeping vehicle or the like.

In several embodiments, the controller in communication with the distance sensor monitors the pitch (upward or downward angle) of the extending shaker head in order to electronically regulate alignment of the distance sensor's detection point with the height at which the head will clamp the tree. The controller in communication with the distance sensor may also further monitor the roll (rotated) position of the extending shaker head in order to adjust the predetermined stopping distance for alignment of the shaker head to the tree.

In several embodiments, the controller in communication with the distance sensor may continuously log sensor output and compare the measured pattern to multiple filter patterns of various sized tree trunks. The controller may further use known tree spacing or may use dynamically measured tree spacing to improve performance of the trunk detection algorithm.

The controller in communication with the distance sensor may also comprise a programmable controller or a network of programmable controllers. The controller may use the tree location or multiple tree locations as references: (1) to propel and stop the harvester to a predetermined distance proximate to each tree to be harvested; (2) to determine when to lift one or more sweeper brushes in order to minimize disturbance of dust; and/or (3) to calculate a desired course over ground for automatic steering. The controller may also utilize measurements from global positioning system receivers, accelerometers, gyroscopes, wheel encoders, steering cylinder potentiometers and other sensors to navigate a harvester vehicle along the desired course over ground.

In another embodiment, means are provided for clearing dust from the optical view of the sensor. In this embodiment, the distance sensor apparatus further comprises a fan to source flowing air and tubing to direct the air flow over the optical line of the distance sensor. The flowing air may be directed through a nozzle, and the nozzle may direct air flow in the shape of a hollow cone. The air stream flowing from the fan maintains a clear optical path for the field of view of the sensor apparatus.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the following accompanying drawings.

Figure 1:
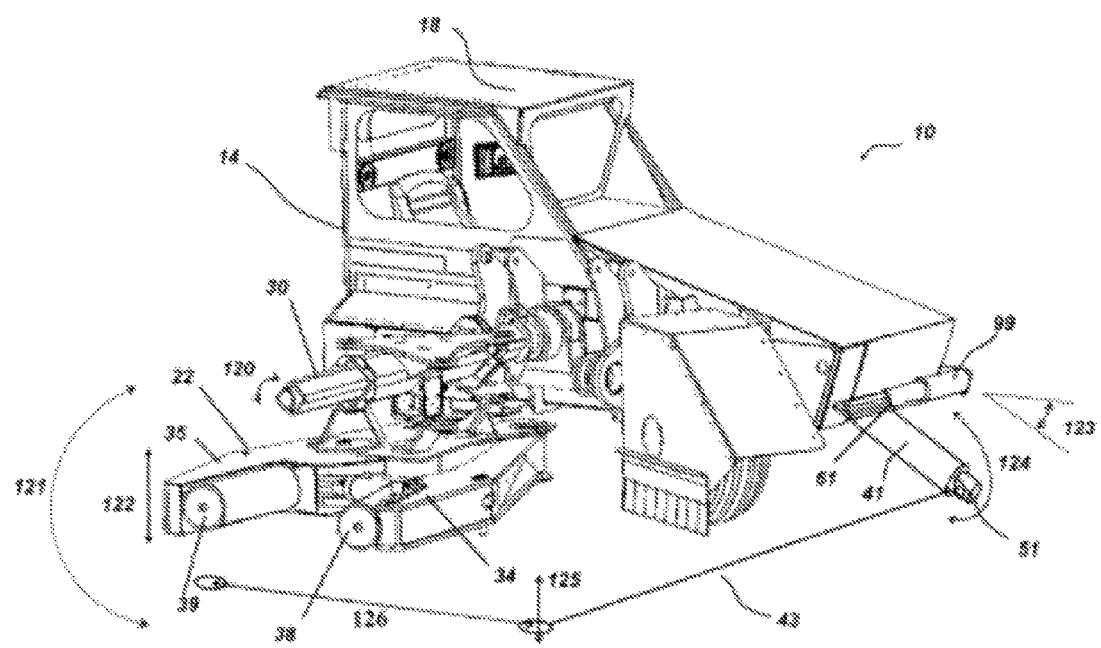
FIG. 1 is a perspective view of a section of a mechanized tree shaker with a preferred embodiment of the distance sensor apparatus.
Figure 1:
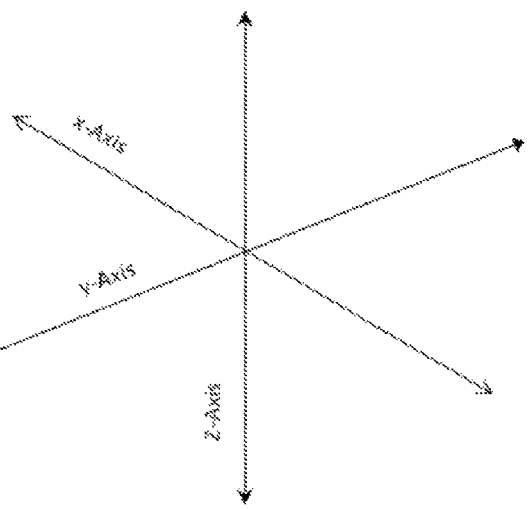

Reference symbols or names are used in the figures to indicate certain components, aspects or features shown therein. Reference symbols common to more than one figure indicate like components, aspects or features shown therein.

DETAILED DESCRIPTION

Reference now will be made in detail to embodiments of the invention, one or more of which are illustrated in the drawings. Each example is provided by way of explanation of the invention, not limitation of the invention. It will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims, and their equivalents.

The present invention is directed to agricultural tree harvesters and harvester apparatus and system for efficiently and effectively sensing the location of a tree trunk proximate to the harvester. The system includes a distance sensor, a surrounding sensor apparatus, and a controller in communication with the distance sensor. Tree location measurements may be used by the controller in the automation of tree harvesting processes, eliminating or minimizing the need for the operator to steer or manually propel drive and stop the harvester.

It should be appreciated that, although the disclosed system and sensor apparatus are primarily described herein with reference to orchard harvest machines including shakers with or without catching frames, the sensor apparatus and controlling system may generally be utilized in any vehicle which operates under a tree canopy, including those which operate where global positioning system (GPS) signals are not reliable and proximate tree trunks exist. For example, the disclosed sensor apparatus may be incorporated into a device and/or system configured for orchard crop handling equipment. As another example, the disclosed device may be incorporated into a system configured to spray, mow, till, prune, or to conduct any other operation associated with orchard crop production.

Figure 2:
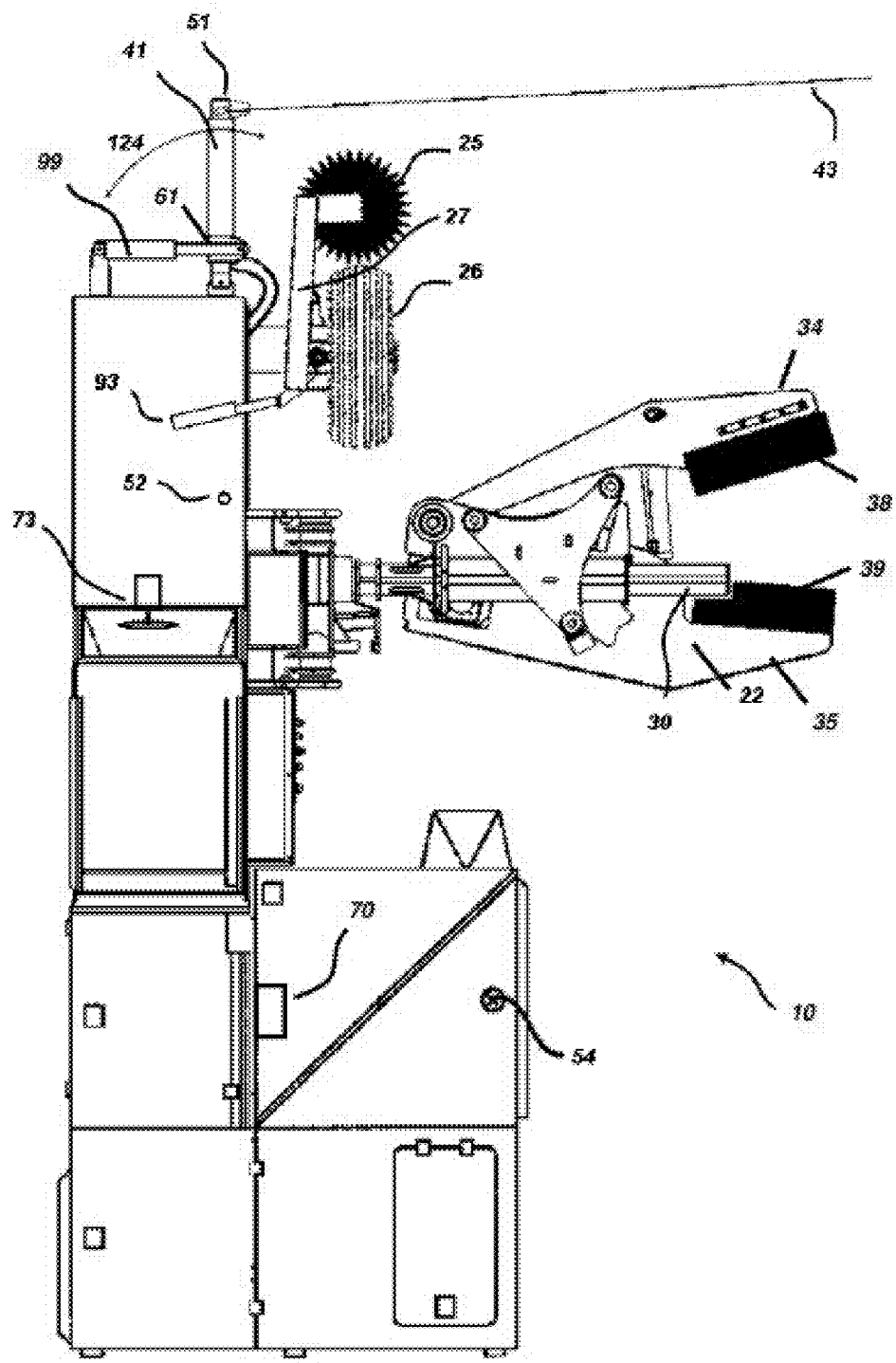
FIG. 2 is a top view of a mechanized tree shaker, including the section shown in FIG. 1.

Referring now to FIGS. 1 and 2, a mechanized tree shaker 10 incorporating an embodiment of the distance sensor apparatus is illustrated. Also shown in FIG. 1 is a set of three-dimension coordinate axes, wherein the x-axis represents distance along the direction of movement of the tree shaker over the ground, the y-axis represents distance perpendicular from the x-axis, that is distance from the side of the tree shaker, and the z-axis represents height. FIG. 1 illustrates a perspective view of a portion of the mechanized tree shaker. FIG. 2 illustrates a top plan view of the mechanized shaker.

As shown in FIGS. 1 and 2, the tree shaker 10 includes a body 14 enclosing a drive engine (not shown), an operator's cab 18, a tree clamping and shaker head 22 that is mounted to one side of the vehicle such that the operator can view the tree clamping and shaking process, and a single front steering wheel 26, mounted on a caster, for maneuvering the tree shaker 10 over the ground. The body has a front end, a first side and a second side. As shown in FIG. 2, in front of the front steering wheel, a rotating sweeper brush 25 is mounted on a lifting pivot arm 27.

Referring to FIG. 1, the shaker head 22 is movably mounted upon an outwardly projecting support boom 30, such that the shaker head 22 may move along the y-axis, outwardly to clamp a tree trunk and shake the tree, and then be retracted back toward the harvester. In a preferred embodiment, the support boom 30 is movably mounted at the first side of the vehicle body. The shaker head 22 has two jaws, 34 and 35, with shaking pads 38 and 39, respectively that function to clamp a tree trunk and shake the tree. The support boom 30 may be pitched: that is, raised and lowered along the z-axis, shown at double headed arrow 122 to raise or lower the shaker head 22. The boom may be rolled: that is, rotated about the y-axis, as shown by double headed arrow 120 to roll or rotate the head 22 and to change the roll angle, shown by double headed arrow 121, at which the jaws 34, 35 of the head 22 engage a tree trunk. Thus, the jaws of the head 22 may be positioned at various heights and at various roll angles to accommodate trees of various heights and with trunks having various angles from vertical, such as shown for example in FIG. 5.

As shown in FIGS. 1 and 2, the harvester vehicle 10 is equipped with a rotating distance sensor apparatus 41. In a preferred embodiment, the distance sensor apparatus 41 is attached to a rotating boom 61 and is positioned on the harvester near the front end of the vehicle body. The distance sensor apparatus includes a distance sensor 51 which may comprise a laser distance sensor. The preferred brand and model number of the laser distance sensor is Baumer Ltd, OADM 250U1101. Alternatively, the distance sensor apparatus may comprise a depth imaging camera sensor. The preferred brand and model number of the depth imaging camera sensor is IFM Efector, Inc., O3D200. While these are the preferred brands and model numbers, other sensors similar to these may be utilized so long as they function for their intended purposes.

As shown in FIGS. 1 and 2, rotation of the sensor apparatus 41 is regulated by a linear actuator 99. The apparatus 41 has a downward angle 123 from horizontal, and the angular rotation 124 of the apparatus contains a vertical component allowing the sensor field of view to locate a proximate tree at varied height, represented by the double headed arrow 125.

Figure 3:
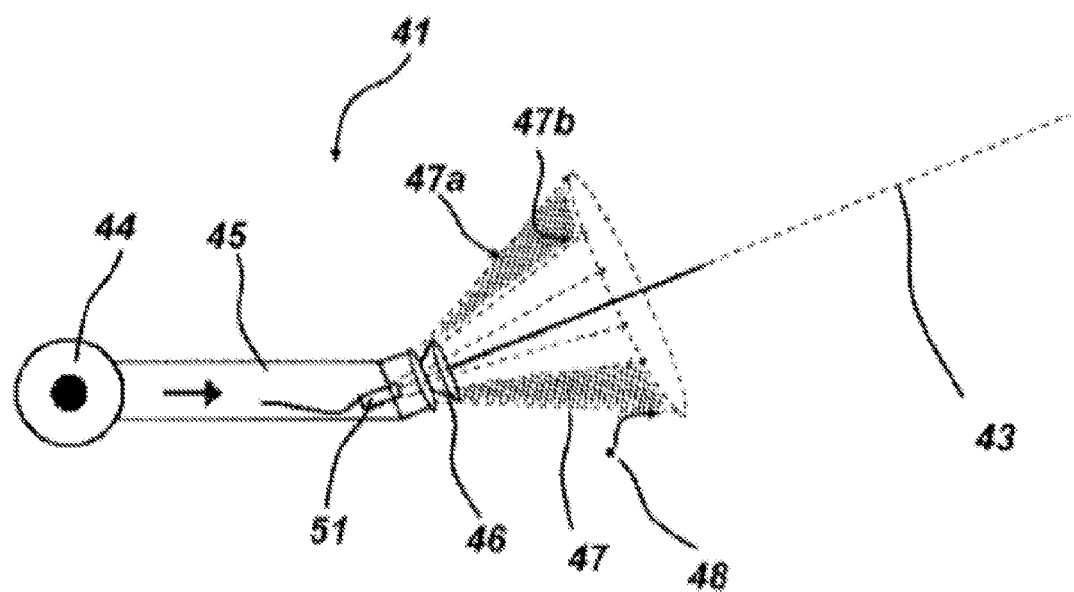
FIG. 3 is a top plan view of the distance sensor apparatus of the FIG. 1 tree shaker showing a laser sensor apparatus with an air source and a dust clearing nozzle.

As shown in FIG. 3, a preferred embodiment of the distance sensor apparatus 41 comprises a laser distance sensor 51, a fan 44 to source filtered flowing air, and tubing 45 to direct the air flow over the optical line of the distance sensor 51. An air nozzle 46 creates a flowing air stream in the shape of an outer cone 47a, and a much slower air stream 47b inside the outer cone.

During operation, the laser beam 43 of the distance sensor 51 is transmitted from the sensor along the centerline of the nozzle 46 outlet in a direction away from the sensor toward a tree. The outer cone airstream 47a begins at the discharge end of the nozzle 46 and blows away from the sensor beam 43. Because areas of higher velocity have a lower pressure, nearby dust particles 48 will be drawn into the outer cone 47a airstream and repelled from entering the optical view of the sensor 51.

The distance sensor 51 and linear actuator 99 are in communication with a programmable controller 70 which utilizes distance measurements to identify the existence and relative location of a proximate tree. The controller may comprise any suitable computer and/or other processing unit, including any suitable combination of processing units, which may be communicatively coupled to one another (e.g., the controller may form all or part of a controller network).

Figure 4:
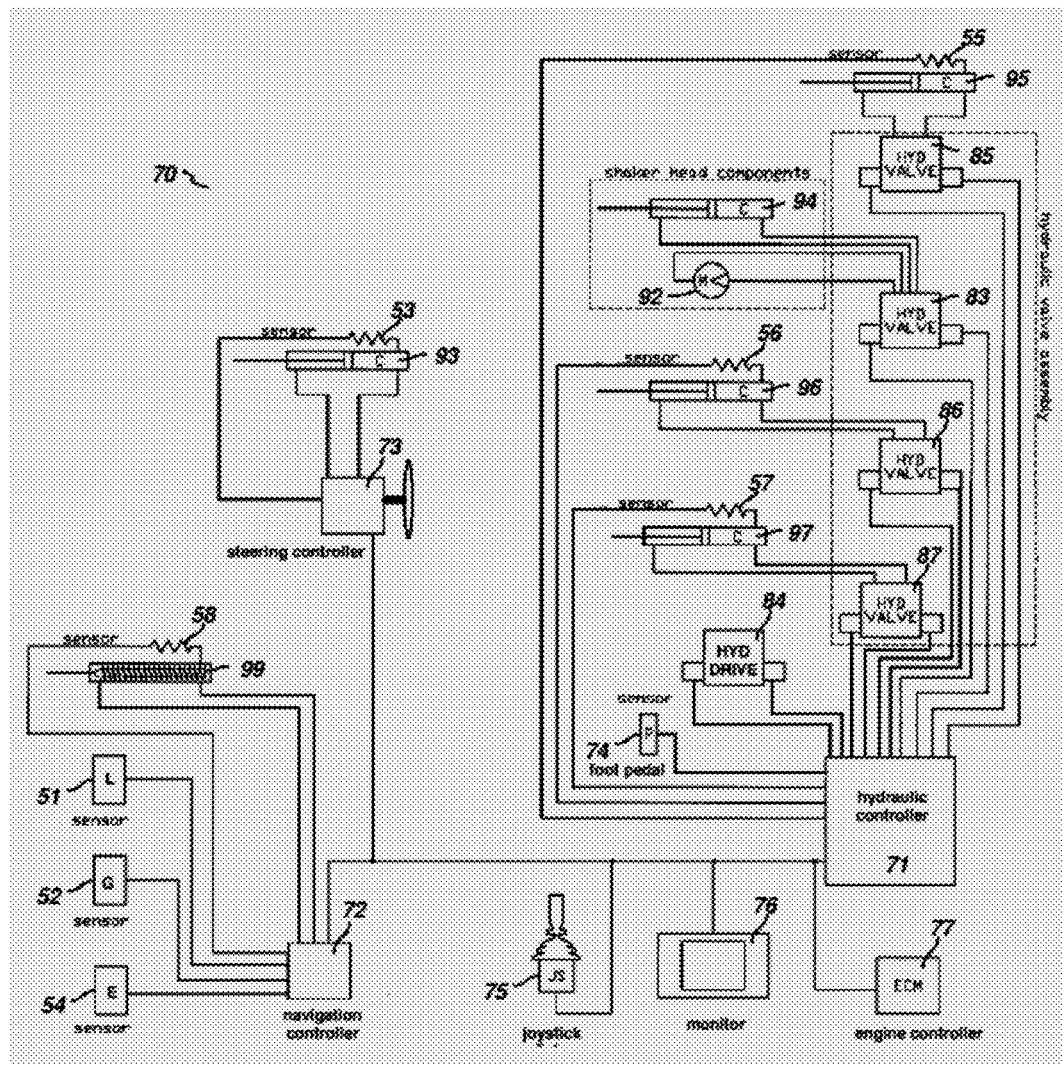
FIG. 4 is a schematic diagram of a networked system of programmable controllers for execution of tree sensing, tree shaking, vehicle propulsion, and steering.

FIG. 4 is a schematic showing controller 70 comprising a network of programmable controllers, such as but not limited to, preferably, a commercially available controller made by Danfoss, model Plus+1 system with one or more custom modules. The network 70 includes a conventional hydraulic controller 71 to control harvester propel functions, that is, motion over the ground, with a conventional hydrostat drive 84. The hydraulic controller 71 also regulates shaker head 22 movement with a head extension cylinder 95, a head clamp cylinder 94, a head pitch actuating cylinder 96 and a head roll actuating cylinder 97. The controller network 70 also contains a navigation controller 72 which receives and processes data from the distance sensor 51, gyroscope sensor 52 and the wheel encoder sensor 54. The navigation controller 72 can manipulate the distance sensor's field of view using linear actuator 99. The incorporated steering controller 73 actuates and measures position of a steering cylinder 93 to maintain a desired or predetermined vehicle course over ground. The engine controller 77 regulates engine speed for propel and shake processes. A joystick 75, a foot pedal 74, and a monitor 76 serve as interfaces for operator monitoring and control.

The joystick 75 (or a similar input device) in the controller 70 allows operator regulated movement of the shaker head 22, including the pitch 122: height above ground and the roll 121 of the shaker head 22 about the support boom 30 to establish a position of the shaker head 22 for shaking a tree and to establish a base position from which the vehicle moves and senses the next tree. The controller 70 is equipped to measure the pitch 122 of the shaker head 22 via potentiometer 56 in a pitch or height hydraulic cylinder 96. The controller can further use this measurement to determine the height at which the head will clamp the tree and can regulate linear actuator 99 to adjust the sensor 51 field of view height 125 to sense the next tree.

By attaching the distance sensor 51 to a movable apparatus or component, such as a rotating boom 61, rather than being fixed on the shaker head 22 as in pre-existing harvesters, this configuration allows the controller 70 in communication with the distance sensor to monitor the height of the extending shaker head in order to electronically determine alignment of the shaker head 22 to the tree trunk by comparing data from the distance sensor's detection point with the height of the tree trunk at which the head will clamp the tree, thus providing a more accurate detection and clamping of a tree trunk at a preferred height along the tree trunk.

The improved accuracy of the sensing mechanism of the present invention is further illustrated with reference to FIG. 5, which depicts a tree 127 that has a trunk rising from the ground at an angle from vertical. In order for the harvester vehicle to stop at the proper horizontal shake location 129 of such a tree, the sensor 51 must locate the tree at the correct vertical location 128, which is generally the height of the trunk at which branching begins. Determining the correct location 129 along the ground corresponding to the correct vertical location 128 of a specific tree is accomplished through sensed head pitch position 122.

Figure 5:
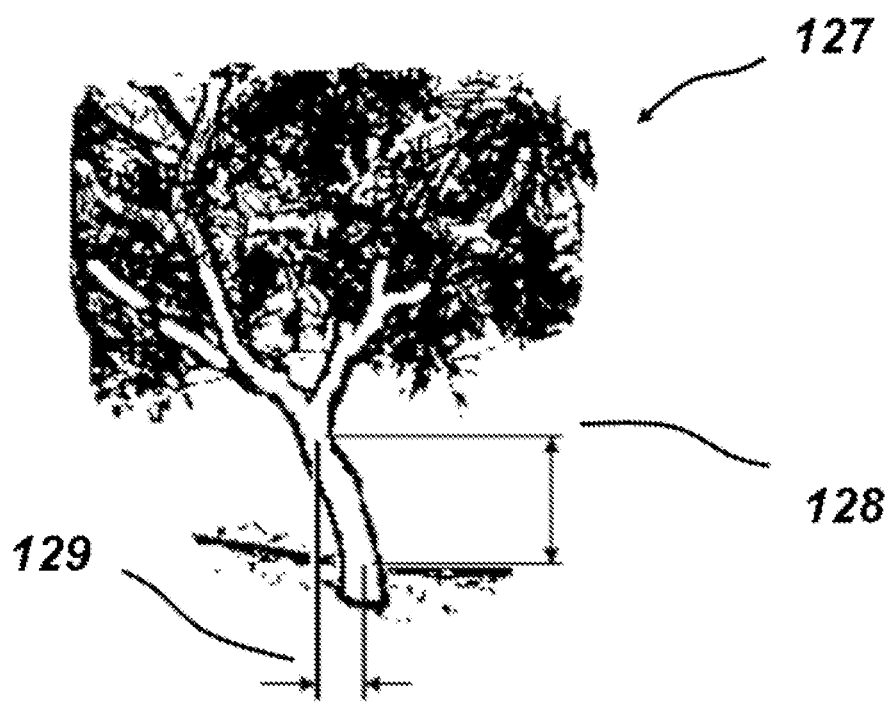
FIG. 5 is a side view of a tree with its trunk growing at an angle from vertical and a preferred vertical shake location to be located by the distance sensor apparatus.

Typically when a tree trunk is standing at an angle as in FIG. 5, the shaker head 22 will be rolled or rotated 121 to an angle so that the jaws 34, 35 clamp the tree perpendicular to the trunk. This roll or rotation 121 changes the relative position of the head shake location along the x-axis as depicted in FIG. 1. The controller 70 in FIG. 4 is equipped to measure the roll 121 of the shaker head 22 via a potentiometer 57 in roll actuating cylinder 97. The controller 70 uses the measured roll to calculate an adjustment to the predetermined stopping distance 126 so that the shaker head 22 will always stop aligned with the proximate tree. The controller 70 may also be capable of executing automated propel and stop functions while utilizing distance measurements from the distance sensor 51. The machine operator may engage the automatic drive by simultaneously pressing a joystick trigger button (or a similar input device) and depressing the hydrostat drive pedal. The harvester then will begin automated forward movement in a direction along the x-axis as shown in FIG. 1, while the distance sensor 51 scans for a proximate tree. The controller 70 utilizes input signals from one or more wheel encoder sensor(s) 54 in order to monitor harvester displacement over the ground. When a tree is found during the forward movement, as represented at the location of small circle about the arrow 125 shown in FIG. 1, the controller 70 continues to propel the machine a predetermined distance represented by the double headed arrow 126 and then halts forward movement with the shaker head 22 adjacent the tree (represented by the small circle at the left end of arrow 126 in FIG. 1). The controller 70 then holds the harvester's position and the operator acknowledges the shake position such as by pressing a conventional shake button (not shown).

The operator presses the joystick shake button (or similar input device) (not shown), which sends a signal to the controller 70 to initiate an automated shaking process in which the support boom 30 moves outward, in the y-axis direction towards the tree. When the shaker head 22 reaches the proximate tree as determined from the data provided by the distance sensor 51, the controller sends a signal to halt outward movement of the boom 30. The jaws 34 and 35 of the shaker head then clamp and shake the tree, and then unclamp the tree and the boom 30 moves the shaker head back toward the harvester body 14. The length of time that the tree is shaken is predetermined and is controlled by the controller 70.

After an automated shake process is finished, the controller 70 sends signals to propel the harvester vehicle forward over the ground in the x-axis direction, or along the vehicle's longitudinal axis. Upon traveling approximately two-thirds of a predetermined distance to the next tree, the controller preferably then sends control signals to lift the sweeper pivot arm 27 and to slow forward movement of the harvester 10. The controller 70 then initiates a scanning process to monitor the data output from the distance sensor 51 in order to locate the next tree proximate to the machine.

Figure 6:
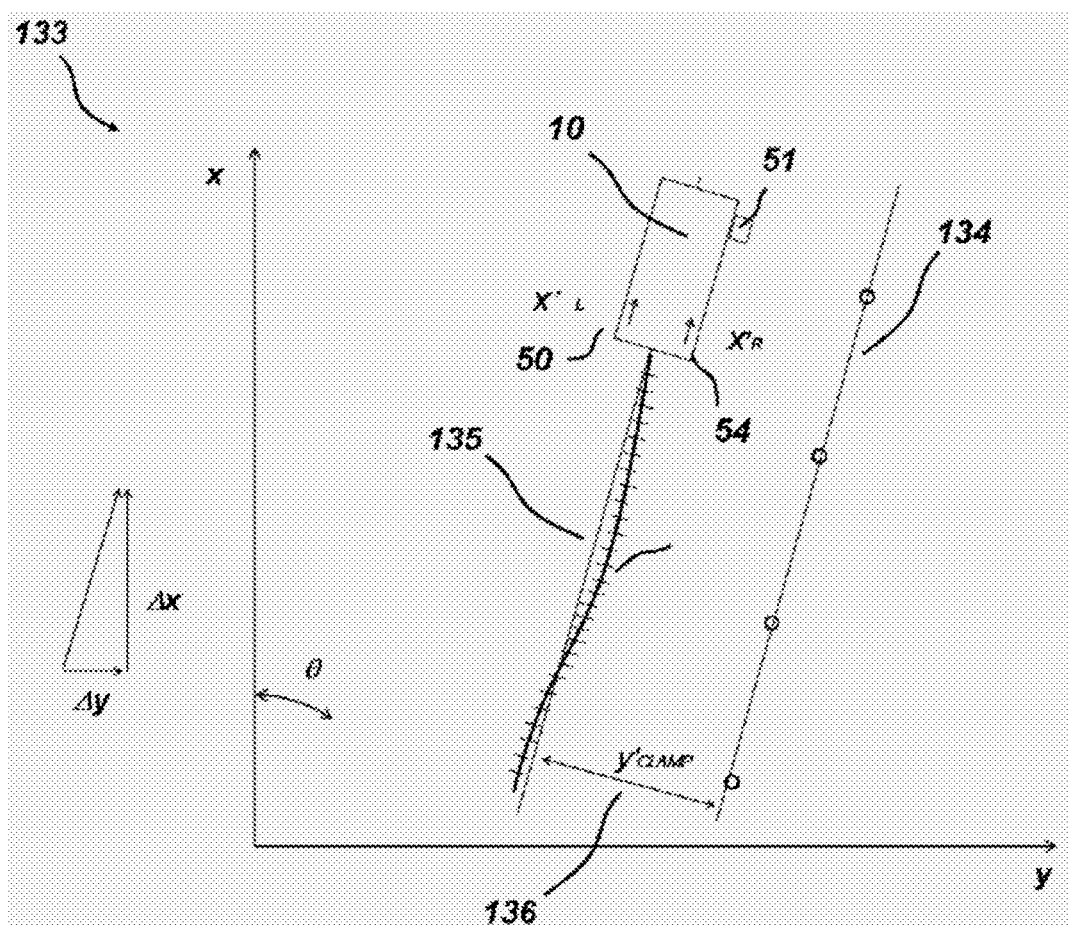
FIG. 6 is a diagram of the top view of a harvester following a course over ground which is referenced to a tree line; and, FIG. 7 is a graph illustrating an outline representing the distance of an exemplary tree trunk from the distance sensor apparatus along the path of travel of the tree shaker over ground and exemplary tree trunk curvature filters corresponding to exemplary tree trunk diameters at various distances of the tree trunks from the tree shaker.

FIG. 6 shows a diagram 133 of the top view of a harvester 10 following a course over ground 135 which is referenced to a tree line 134. As the harvest vehicle 10 pulls into a row of trees, the relative location of the first tree in the row may be located by the distance sensor 51. As the harvest vehicle propels forward, the controller 70 determines linear displacement with wheel encoder sensors 50 and 54 and simultaneously determines angular velocity with gyroscope sensor 52. With discrete time steps, the integration of angular velocity is a summing function which allows calculation of vehicle angular displacement, as follows:

$\theta = \Sigma \Delta \theta$, where $\Theta$ is the angular displacement of the vehicle and $\Delta \Theta$ is the angular velocity as measured by the gyroscope.

Changes in the vehicle two-dimensional x,y positions are calculated using the encoder distance and the vehicle angular displacement, as follows:

$$\Delta x = \cos(\theta) \frac{(x'_L + x'_R)}{2},$$

where $x'_L$ is the displacement of the left wheel and $x'_R$ is the displacement of the right wheel.

$$\Delta y = \sin(\theta) \frac{(x'_L + x'_R)}{2}$$

Summation of change in x and change in y yield the current x,y vehicle position, as follows:

$x = \Sigma \Delta x$ $y = \Sigma \Delta y$

Through this 2-dimensional dead reckoning process, the relative location of the harvester vehicle and relative locations between trees can be calculated. The controller 70 may use three or more tree locations with a least squares regression algorithm to calculate a tree line 134 in the general form, as follows:

$A_T x + B_T y + C_T = 0$, where $A_T$, $B_T$, and $C_T$ are constants.

The tree line may be shifted a perpendicular distance to the left $y'_{CLAMP}$ 136 to calculate a desired vehicle course over ground, as follows:

$A_V x + B_V y + C_V = 0$, where: $A_V = A_T, B_V = B_T$, $\text{Norm}_{AB} = \sqrt{A_V^2 + B_V^2}$, and $C_V = C_T + y'_{CLAMP} \cdot \text{Norm}_{AB}$ if the vehicle heading is the same direction as the tree line 134 (dot product >0), or $C_V = C_T - y'_{CLAMP} \cdot \text{Norm}_{AB}$ if the vehicle heading is the opposite direction as the tree line 134 (dot product <0), where $y'_{CLAMP}$ is the desired perpendicular distance 136 between the tree line 134 and the vehicle desired course over ground 135.

The controller 70 includes a conventional steering controller 73, schematically shown in FIG. 6, which navigates the harvester vehicle to follow the desired course over ground.

Figure 7:
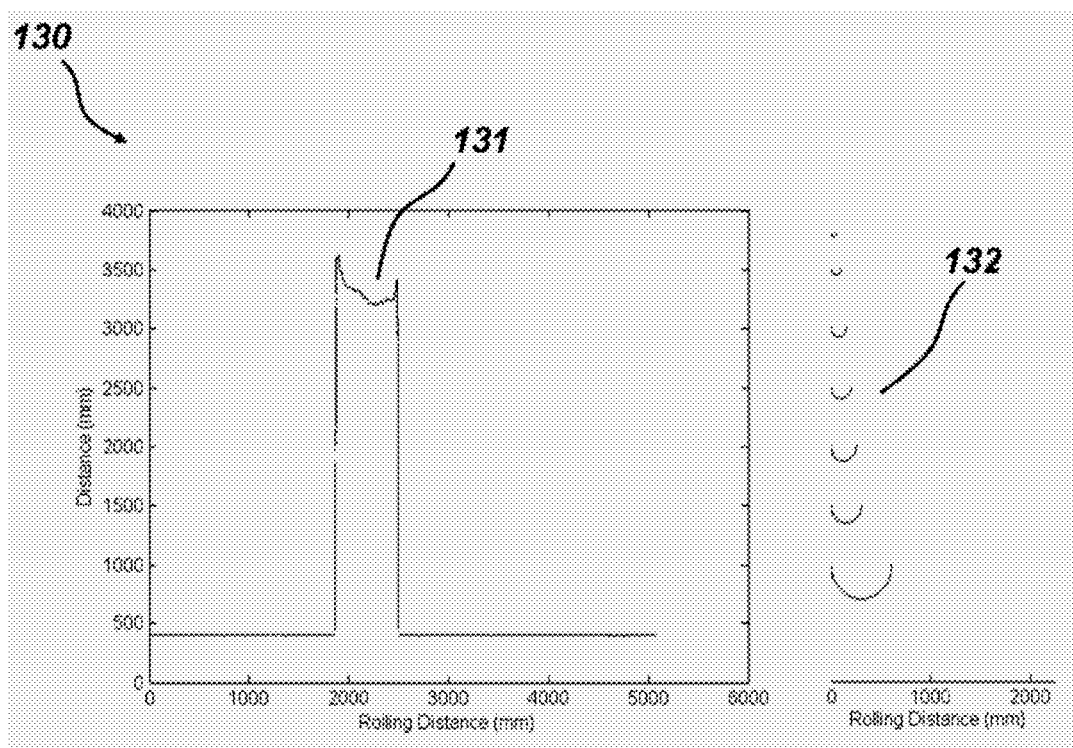

FIG. 7 is a graph 130 containing exemplary distances to a tree trunk from a reference point, such as from the sensor 51, based on data generated by the sensor 51, plotted against the distance of travel, i.e., "rolling distance" of the harvester over the ground. When a harvester vehicle passes a tree, the distances are shown in the form of a curve 131 of the proximate tree. The controller 70 may store these data and compare the curves 131 or compare the data to a series of curve filters 132 of trees of varied diameters. A comparison algorithm will yield a result to identify when a tree trunk is in view and show its location relative to the harvest vehicle.

This written description uses examples to disclose the invention, including the best mode, and also to enable any person skilled in the art to practice the invention, including making and using any devices or systems and performing any incorporated methods. Although specific embodiments of the invention have been described, various modifications, alterations, alternative constructions, and equivalents are also encompassed within the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A harvesting vehicle comprising:
a body having a front end, a first side and a second side;
an engine in said body and adapted to move the vehicle over ground and to power harvesting vehicle components;
said harvesting vehicle components including:
a support boom movably mounted at the first side of said vehicle and outwardly projecting from said vehicle;
a tree shaker head comprising two opposed jaws movably mounted on said support boom;
a distance sensor apparatus attached near the front end of said vehicle body, wherein said distance sensor apparatus includes a distance sensor adapted to generate data representative of distance from a reference point;
a controller that is positioned on said harvester, operably engaged with said engine, said distance sensor apparatus and said shaker head; wherein said controller is adapted to control operation of said harvester, and is adapted to measure pitch of said shaker head.

2. The harvesting vehicle of claim 1 wherein said shaker head is adapted to rotate about said support boom.

3. The harvesting vehicle of claim 1 wherein said distance sensor is selected from the group consisting of a laser distance sensor and a depth imaging camera sensor.

4. The harvesting vehicle of claim 1 wherein said distance sensor apparatus comprises a sensor on a rotating boom.

5. The harvesting vehicle of claim 1 wherein said controller is adapted to rotate said support boom to change the angle at which said opposed jaws engage a tree trunk.

6. The harvesting vehicle of claim 1 wherein said controller comprises a networked system of controllers.

7. The harvesting vehicle of claim 1 wherein said controller is adapted to control height of the shaker head above ground and to control angle of the jaws of the shaker head for clamping of the jaws about a trunk of a tree at a predetermined height and at a predetermined angle from horizontal.

8. The harvesting vehicle of claim 1 wherein said controller is adapted to execute automated steering of said harvesting vehicle in response to data generated by said distance sensor.

9. The harvesting vehicle of claim 1 wherein said controller is adapted to use said measurement of the shaker head pitch to electronically regulate the angle at which said distance sensor measures distance.

10. The harvesting vehicle of claim 3 further including tubing positioned over said laser distance sensor and extending a predetermined distance, and a fan positioned in said tubing and adapted to source flowing air in the direction of the distance sensor's laser beam whereby during operation of said fan dust is cleared from an optical path along said laser beam.

11. The harvesting vehicle of claim 4 wherein said rotating boom is connected to and rotates through operation of an actuator that is communicatively connected to said controller.

12. The harvesting vehicle of claim 5 wherein said controller measures the roll of said shaker head and uses said measurement of shaker head roll to electronically regulate a predetermined stopping distance.

13. The harvesting vehicle of claim 10 further including a nozzle positioned in said tubing downstream of the fan.

14. An agricultural tree harvesting vehicle having a body, wherein said body has a front, a first side, a longitudinal axis, a lateral axis, a shaker head with opposed jaws and a programmable controller, the improvement comprising:
a rotating boom positioned at the body front and rotatable through a predetermined range of angles;
a laser distance sensor mounted on the rotating boom, positioned to generate data representative of horizontal distance from the sensor to a proximate tree trunk and adapted to communicate with said programmable controller;
a support boom connected to the first side of the vehicle body, adapted to reciprocate toward and away from the vehicle body in a direction parallel to said lateral axis and adapted to rotate to an angle from horizontal in response signal provided by said controller;
wherein said shaker head is attached to said support boom;
said controller adapted to determine a desired tree trunk clamping position for said shaker head opposed jaws from data provided by said distance sensor, provided by a wheel encoder sensor, and provided by a gyroscope sensor; and,
said controller adapted to move said shaker head to the clamping position and to clamp said opposed jaws about the tree trunk.

15. The harvesting vehicle of claim 14 further comprising tubing positioned on the rotating boom, enclosing a fan upstream of said distance sensor, enclosing said distance sensor and extending from said fan and said distance sensor for a predetermined distance in the direction of flow from said fan; and
an air nozzle positioned downstream of the fan and upstream of the distance sensor for generating air flow to provide a clear optical path from the laser distance sensor to the tree trunk.

16. A method of harvesting a crop from a tree comprising:
providing a harvesting vehicle having a body, an engine, wherein said body has a front, a first side, a longitudinal axis, a lateral axis, a support boom attached to and projecting from said first side, a shaker head mounted on said support boom and having opposed jaws, a distance sensor apparatus mounted near the front end of said body, a distance sensor mounted on said distance sensor apparatus, and a programmable controller operably engaged with said engine, said shaker head and said distance sensor;
propelling said vehicle forward along the vehicle's longitudinal axis;
while propelling the vehicle forward, scanning with said distance sensor and locating a first tree having a trunk extending from ground;
when the sensor reaches a point where said sensor is on a line parallel to the vehicle's lateral axis, transmitting data from said sensor to the controller that represents horizontal distance from the sensor to the first tree's trunk;
then propelling said vehicle forward a predetermined distance to where the jaws of the shaker head face the first tree;
then stopping forward movement of said vehicle;

while said vehicle is stopped, extending said support boom toward the trunk of the first tree;

when the shaker head engages the trunk of the first tree, said support boom stops extending and the jaws of the shaker head clamp around the trunk of the first tree;

shake the first tree for a predetermined period;

unclamp the jaws from the first tree; and, retract the shaker head back towards the body of said harvester to complete shaking of the first tree.

17. A method of harvesting a crop from a tree comprising:

providing a harvesting vehicle having a body, an engine, wherein said body has a front, a first side, a longitudinal axis, a lateral axis, a support boom attached to and projecting from said first side, a shaker head mounted on said support boom and having opposed jaws, a distance sensor apparatus mounted near the front end of said body, a distance sensor mounted on said distance sensor apparatus, and a programmable controller operably engaged with said engine, said shaker head and said distance sensor;

propelling said vehicle forward along the vehicle's longitudinal axis;

while propelling the vehicle forward, scanning with said distance sensor and locating a first tree having a trunk extending from ground;

when the sensor reaches a point where said sensor is on a line parallel to the vehicle's lateral axis, transmitting data from said sensor to the controller that represents horizontal distance from the sensor to the first tree's trunk;

then propelling said vehicle forward a predetermined distance to where the jaws of the shaker head face the first tree;

then stopping forward movement of said vehicle;

while said vehicle is stopped, extending said support boom toward the trunk of the first tree;

when the shaker head engages the trunk of the first tree, said support boom stops extending and the jaws of the shaker head clamp around the trunk of the first tree;

shake the first tree for a predetermined period;

unclamp the jaws from the first tree;

retract the shaker head back towards the body of said harvester to complete shaking of the first tree; and, again propelling said vehicle forward and scanning with said distance sensor and locating a second tree to shake the second tree.

\* \* \* \* \*